Patented May 18, 1937

2,081,017

UNITED STATES PATENT OFFICE 2,081,017

VAT-DYESTUFF PREPARATIONS

Josef Nüsslein, Karl Daimler, and Carl Platz, Frankfort-on-the-Main, Germany, assignors to General Aniline Works, Inc., New York, N. Y., a corporation of Delaware No Drawing. Application April 22, 1935, Serial No. 17,746. In Germany May 5, 1934

6 Claims. (Cl. 8—6)

The present invention relates to vat-dyestuff preparations.

We have found that an especially good effect is obtained in printing with vat-dyestuffs by using vat-dyestuff preparations which contain betaines of the following formula:

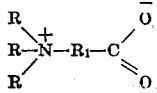

wherein R stands for an aliphatic radical and $R_1$ stands for a member of the group consisting of aliphatic and aromatic radicals.

As betaines of the above formula there may be used, besides the betaines themselves, also substituted betaines; furthermore, there may be used substitution products which contain hydroxyl groups. Instances are: betaine, ethyldimethylbetaine, tributylbetaine, benzyldibutylbetaine, trihydroxyethylbetaine, dimethylisohexylbetaine, the betaine of the trimethylaminobenzoic acid or of the tributylaminobenzoic acid.

The betaines improve the uniformity of the printing pastes and the printing capacity, and also the fixation of the dyestuff which means an improved protection under variation of the steam conditions, uniformity of the prints and in many cases an improved intensity of the dyeings. Furthermore, by using betaines, a better throughprinting (penetration of the printing pastes through the goods) and an improvement of the fasteness of the prints are obtained. An especial advantage resides in the fact that prints on artificial silk, on which in general uniform prints are obtainable only with difficulty, are favorably influenced with respect to depth of color and uniformity.

The betaines may be added to printing pastes of any composition. Furthermore, printing pastes which contain dyestuff-diluents and betaines, may be printed on the material and the latter then padded in an alkaline solution of sodium sulfoxylate-formaldehyde or hydrosulfite, squeezed and steamed. The adjuvants may also be applied in direct printing, discharge printing and reserve printing; they may be added to dyestuff pastes or powders or other preparations and in this way incorporated with the printing color. The amount added depends on the requirements in each particular case with regard to the chemical structure of the dyestuff used.

The following examples serve to illustrate the invention, but they are not intended to limit it thereto; the parts are by weight:

(1) A printing paste is prepared from:
60 parts of the dyestuff No. 1228 (Schultz, Farbstofftabellen, 1931, vol. 1),
100 parts of glycerine,
120 parts of potassium-carbonate,
100 parts of formaldehyde-sulfoxylate,
20 parts of betaine of the following formula:

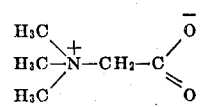

The whole is made up with starch-tragacanth-thickening to 1000 parts

A beautiful homogenous printing color is obtained which may easily be handled. Even if the material is steamed for a short time only, the fixation is essentially better, the shade is fuller and more vivid and the print penetrates more fully through cotton and artificial silk than is the case when a printing paste is used which has the same composition but contains no betaine.

(2) A printing paste is prepared as indicated in Example 1. Instead of the dyestuff mentioned therein 150 parts of the dyestuff No. 1314 (Schultz, Farbstofftabellen, 1931, vol. 1) are used and instead of 20 parts of betaine 40 parts of betaine are used. A uniform print is obtained.

(3) A printing paste is prepared as indicated in Example 1 by using 150 parts of an aqueous paste of 10 per cent. strength obtainable from the dyestuff of the following formula:

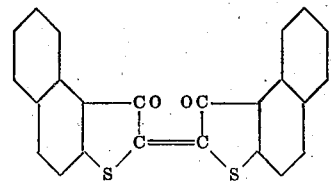

and by using, instead of 20 parts of betaine, 50 parts of betaine per 1000 parts of printing color. On cotton uniform prints are obtained which, however, due to the essentially stronger penetration appear rather more feeble than the normal prints prepared without addition of betaine, whereas on artificial silk full advantage may be taken of the dyeing-power in spite of the increased penetration and improved uniformity.

(4) By adding 20 parts of triethylbetaine of the formula:

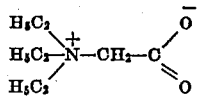

or 20 parts of dimethylisohexylbetaine of the formula:

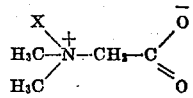

wherein X stands for an isohexyl radical, to a printing paste which contains 70 parts of the dyestuff No. 1228 (Schultz, Farbstofftabellen, 7th edit.) per 1000 parts of printing color, the dyeing power on cotton and artificial silk and the speed of the fixation are improved.

(5) By adding 20 parts of betaine or triethylbetaine to a printing paste which contains per 1000 parts of printing color 150 parts of the dyestuff obtainable according to German Patent No. 558,443, the dyeing power on cotton and artificial silk and the speed of the fixation are considerably improved.

We claim:

1. Dyestuff preparations containing a vat-dyestuff and a compound of the following general formula:

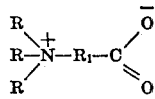

wherein R stands for an aliphatic radical and $R_1$ stands for a member of the group consisting of aliphatic and aromatic radicals.

2. Dyestuff preparations containing a compound of the following general formula:

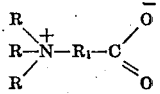

wherein R and $R_1$ stand for aliphatic radicals.

3. Dyestuff preparations containing a vat-dyestuff and a compound of the following general formula:

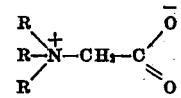

wherein R stands for an alkyl radical.

4. The dyestuff preparation containing a vat-dyestuff and the trimethylbetaine of the following formula:

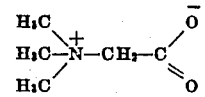

5. The dyestuff preparation containing a vat-dyestuff and the triethylbetaine of the following formula:

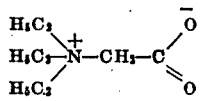

6. The dyestuff preparation containing a vat-dyestuff and the dimethylisohexylbetaine of the following formula:

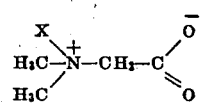

wherein X stands for an isohexyl radical.

JOSEF NÜSSLEIN.
KARL DAIMLER.
CARL PLATZ.